(12) United States Patent
Sun

(10) Patent No.: US 10,824,327 B2
(45) Date of Patent: Nov. 3, 2020

(54) SCREEN CAPTURING METHOD AND SYSTEM FOR ELECTRONIC DEVICE, AND ELECTRONIC DEVICE

(71) Applicant: HUIZHOU TCL MOBILE COMMUNICATION CO., LTD., HuiZhou, Guangdong (CN)

(72) Inventor: Jipeng Sun, HuiZhou (CN)

(73) Assignee: HUIZHOU TCL MOBILE COMMUNICATION CO., LTD., Huizhou, Guangdong (CN)

(*) Notice: Subject to any disclaimer, the term of this patent is extended or adjusted under 35 U.S.C. 154(b) by 0 days.

(21) Appl. No.: 16/347,616

(22) PCT Filed: Oct. 24, 2017

(86) PCT No.: PCT/CN2017/107529
§ 371 (c)(1),
(2) Date: May 6, 2019

(87) PCT Pub. No.: WO2018/082484
PCT Pub. Date: May 11, 2018

(65) Prior Publication Data
US 2019/0278453 A1    Sep. 12, 2019

(30) Foreign Application Priority Data
Nov. 4, 2016 (CN) .......................... 2016 1 0964545

(51) Int. Cl.
*G06F 3/14* (2006.01)
*G06F 3/0488* (2013.01)
(Continued)

(52) U.S. Cl.
CPC .......... *G06F 3/0488* (2013.01); *G06F 3/0484* (2013.01); *G06F 3/04845* (2013.01); *G06F 3/04895* (2013.01); *G06F 9/451* (2018.02)

(58) Field of Classification Search
CPC ........................................................ G06F 3/14
(Continued)

(56) References Cited

U.S. PATENT DOCUMENTS

| 8,780,125 B2 | 7/2014 | Tankleff et al. |
| 2009/0031006 A1* | 1/2009 | Johnson ................ G06F 16/972 709/218 |

(Continued)

FOREIGN PATENT DOCUMENTS

| CN | 101710936 A | 5/2010 |
| CN | 103729174 A | 4/2014 |

(Continued)

OTHER PUBLICATIONS

International Search Report for PCT/CN2017/107529 dated Jan. 23, 2018.

*Primary Examiner* — Ruay Ho
(74) *Attorney, Agent, or Firm* — Hauptman Ham, LLP

(57) ABSTRACT

A screen capturing method for an electronic device is provided and includes: acquiring and parsing interface information currently displayed in an electronic device to obtain information about all view controls for a specified window; parsing the information about view controls, constructing all view controls for the specified window into a view control tree, and building a presentation interface including image views corresponding to all view controls; receiving a click instruction from a user for clicking one of the image views, removing the image view clicked by the user from the presentation interface, and saving the current presentation interface when a save instruction is received; and capturing an image of the presentation interface in the current screen and saving the captured image.

11 Claims, 4 Drawing Sheets

(51) Int. Cl.
*G06F 9/451* (2018.01)
*G06F 3/0484* (2013.01)
*G06F 3/0489* (2013.01)

(58) Field of Classification Search
USPC .......................... 715/234, 769, 762; 709/218
See application file for complete search history.

(56) References Cited

U.S. PATENT DOCUMENTS

| | | | |
|---|---|---|---|
| 2010/0162141 A1* | 6/2010 | Koch | G06Q 10/10 715/762 |
| 2015/0121193 A1* | 4/2015 | Beveridge | G06F 40/174 715/234 |
| 2017/0371844 A1 | 12/2017 | Yao | |
| 2019/0179836 A1* | 6/2019 | Nishimura | G06F 16/00 |

FOREIGN PATENT DOCUMENTS

| | | |
|---|---|---|
| CN | 104571866 A | 4/2015 |
| CN | 105843494 A | 8/2016 |
| CN | 106527892 A | 3/2017 |

\* cited by examiner

SCREEN CAPTURING METHOD AND SYSTEM FOR ELECTRONIC DEVICE, AND ELECTRONIC DEVICE

FIELD OF THE INVENTION

The present disclosure relates to the technical field of electronic devices, and more particularly to a screen capturing method and system for an electronic device, and an electronic device.

DESCRIPTION OF THE RELATED ART

At present, with the rising of standard of living, electronic devices have almost become a necessity in people's social life. In life, users usually capture screens of electronic devices to save the current display screen, which is convenient and efficient.

However, in existing screen capturing methods, it is the whole screen or a certain continuous region of the whole screen that these methods usually capture, but most of the time these methods cannot satisfy the requirement of capturing content that users really want to capture. For example, there is a case where a view is floating on the current screen and the user wants to capture only the part under this view or a discontinuous region instead of this view. The current screen capturing methods are unable to meet such screen capturing demands.

SUMMARY OF THE INVENTION

The embodiments of the present disclosure provide a screen capturing method and system for an electronic device, and an electronic device having the same, by which the experience of screen capturing can be enriched, various user demands can be met better, and a function of free screen capturing can be realized.

A screen capturing method for an electronic device is provided, comprising the following steps of:

acquiring and parsing interface information currently displayed in an electronic device to obtain information about all view controls for a specified window;

parsing the information about view controls, constructing all view controls for the specified window into a view control tree, and building a presentation interface including image views corresponding to all view controls;

receiving a click instruction from a user for clicking one of the image views, removing the image view clicked by the user from the presentation interface, and saving the current presentation interface when a save instruction is received; and capturing an image of the presentation interface in the current screen and saving the captured image.

In the screen capturing method for the electronic device, the step of acquiring and parsing interface information currently displayed in an electronic device to obtain information about all view controls for a specified window comprises steps of:

acquiring interface information currently displayed in the electronic device to obtain information about all windows, and successively parsing the windows; and acquiring information about all view controls for a specified window according to an acquire instruction.

In the screen capturing method for the electronic device, the step of parsing the information about view controls, constructing all view controls for the specified window into a view control tree, and building a presentation interface including image views corresponding to all view controls comprises steps of:

parsing the information about view controls, and constructing all view controls for the specified window into a view control tree;

transmitting information about each view control in the view control tree to a corresponding view node, and converting the information into node attributes of the corresponding view node; and building a presentation interface according to the node attributes of the view node, the presentation interface including image views corresponding to all view controls.

In the screen capturing method for the electronic device, the step of building a presentation interface according to the node attributes of the view node, the presentation interface including image views corresponding to all view controls, comprises steps of:

drawing each view control into a picture separately and saving the picture; and displaying, according to position information of the view control in the node attributes, the corresponding picture in a same position with an image view to form a presentation interface.

In the screen capturing method for the electronic device, the step of receiving a click instruction from a user for clicking one of the image views, removing the image view clicked by the user from the presentation interface, and saving the current presentation interface when a save instruction is received comprises steps of:

receiving a click instruction from a user for clicking one of the image views on the presentation interface;

setting, when an image view is clicked, tag information of a view node corresponding to the image view as "removed", and removing the image view from the current presentation interface; and receiving a save instruction input by the user, and saving the current presentation interface.

A screen capturing system for an electronic device, comprising:

one or more processors;

a memory; and one or more applications stored in the memory and configured to be executed by the processors, comprising:

an acquisition module configured to acquire and parse interface information currently displayed in an electronic device to obtain information about all view controls for a specified window;

a parsing and building module configured to parse the information about view controls, construct all view controls for the specified window into a view control tree, and build a presentation interface including image views corresponding to all view controls;

an interface processing module configured to receive a click instruction from a user for clicking one of the image views, removing the image view clicked by the user from the presentation interface, and saving the current presentation interface when a save instruction is received; and a screen capturing module configured to capture an image of the presentation interface in the current screen and save the captured image.

In the screen capturing system for an electronic device, the acquisition module comprises:

a first acquisition unit configured to acquire interface information currently displayed in the electronic device to obtain information about all windows, and successively parse the windows; and a second acquisition unit configured to acquire information about all view controls for a specified window according to an acquire instruction.

In the screen capturing system for an electronic device, the parsing and building module comprises:

a parsing unit configured to parse the information about view controls, and construct all view controls for the specified window into a view control tree;

an information processing unit configured to transmit information about each view control in the view control tree to a corresponding view node, and convert the information into node attributes of the corresponding view node; and a building unit configured to build a presentation interface according to the node attributes of the view node, the presentation interface including image views corresponding to all view controls.

In the screen capturing system for an electronic device, the building unit comprises:

a drawing subunit configured to draw each view control into a picture separately and save the picture; and a display unit configured to display, according to position information of the view control in the node attributes, the corresponding picture in a same position with an image view to form a presentation interface.

In the screen capturing system for an electronic device, the interface processing module comprises:

an instruction receiving unit configured to receive a click instruction from a user for clicking one of the image views on the presentation interface;

a tag setting unit configured to set, when an image view is clicked, tag information of a view node corresponding to the image view as "removed", and remove the image view from the current presentation interface; and a saving unit configured to receive a save instruction input by the user, and save the current presentation interface.

An electronic device having a screen capturing system, comprising:

one or more processors;

a memory; and one or more applications stored in the memory and configured to perform, when executed by the processors, the following steps:

acquiring and parsing interface information currently displayed in an electronic device to obtain information about all view controls for a specified window;

parsing the information about view controls, constructing all view controls for the specified window into a view control tree, and building a presentation interface including image views corresponding to all view controls;

receiving a click instruction from a user for clicking one of the image views, removing the image view clicked by the user from the presentation interface, and saving the current presentation interface when a save instruction is received; wherein the removed view is saved in a take-out interface, and the user recovers the view removed last time by clicking a BACK key or by clicking a corresponding view in the take-out interface; and capturing an image of the presentation interface in the current screen and saving the captured image.

In the electronic device having the screen capturing system, the step of acquiring and parsing interface information currently displayed in an electronic device to obtain information about all view controls for a specified window comprises steps of:

acquiring interface information currently displayed in the electronic device to obtain information about all windows, and successively parsing the windows; and acquiring information about all view controls for a specified window according to an acquire instruction.

In the electronic device having the screen capturing system, the step of parsing the information about view controls, constructing all view controls for the specified window into a view control tree, and building a presentation interface including image views corresponding to all view controls comprises steps of:

parsing the information about view controls, and constructing all view controls for the specified window into a view control tree;

transmitting information about each view control in the view control tree to a corresponding view node, and converting the information into node attributes of the corresponding view node; and building a presentation interface according to the node attributes of the view node, the presentation interface including image views corresponding to all view controls.

In the electronic device having the screen capturing system, the step of building a presentation interface according to the node attributes of the view node, the presentation interface including image views corresponding to all view controls, comprises steps of:

drawing each view control into a picture separately and saving the picture; and displaying, according to position information of the view control in the node attributes, the corresponding picture in a same position with an image view to form a presentation interface.

In the electronic device having the screen capturing system, the step of receiving a click instruction from a user for clicking one of the image views, removing the image view clicked by the user from the presentation interface, and saving the current presentation interface when a save instruction is received comprises steps of:

receiving a click instruction from a user for clicking one of the image views on the presentation interface;

setting, when an image view is clicked, tag information of a view node corresponding to the image view as "removed", and removing the image view from the current presentation interface; and receiving a save instruction input by the user, and saving the current presentation interface.

Compared with the conventional technology, in the screen capturing method and system for an electronic device and the electronic device according to the present disclosure, the screen capturing method for an electronic device comprises the following steps of: acquiring and parsing interface information currently displayed in an electronic device to obtain information about all view controls for a specified window; parsing the information about view controls, constructing all view controls for the specified window into a view control tree, and building a presentation interface including image views corresponding to all view controls; receiving a click instruction from a user for clicking one of the image views, removing the image view clicked by the user from the presentation interface, and saving the current presentation interface when a save instruction is received; and capturing an image of the presentation interface in the current screen and saving the captured image. By parsing and rebuilding the current presentation interface to display all views in the presentation interface, users can be free to select parts that they don't want to capture, to finally generate a desired screenshot. The experience of screen capturing is enriched, various user demands are met better, and the function of free screen capturing is realized.

DETAILED DESCRIPTION OF THE PREFERRED EMBODIMENTS

In view of disadvantage of simple screen capturing methods in the prior art, an objective of the present disclosure is to provide a screen capturing method and system for an electronic device. By parsing and rebuilding the current presentation interface to display all views in the presentation interface, users can be free to select parts that they don't want to capture, to finally generate a desired screenshot. The experience of screen capturing is enriched, various user demands are met better, and the function of free screen capturing is realized.

To make the objectives, technical solutions and effects of the present disclosure clearer and more explicit, the present disclosure will be further described below in details by embodiments with reference to the accompanying drawings. It should be understood that the specific embodiments described herein are merely for explaining the present disclosure and not intended to limit the present disclosure.

Figure 1:
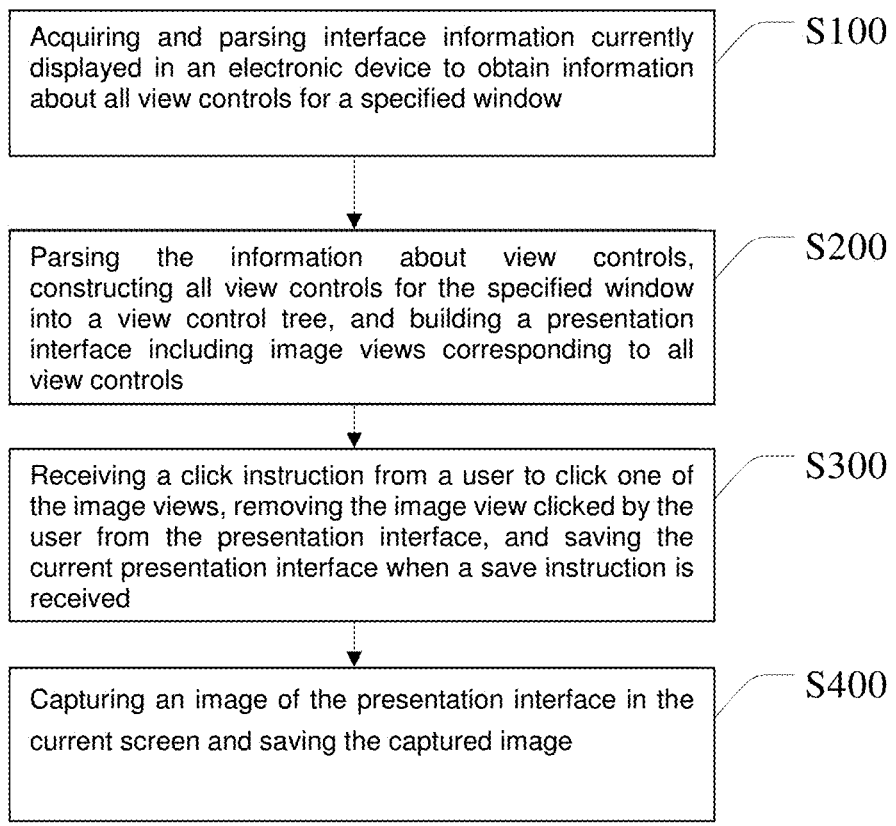
FIG. 1 is a flowchart of a screen capturing method for an electronic device according to the present disclosure.

Referring to FIG. 1, the screen capturing method for an electronic device according to the present disclosure comprises the following steps:

S100: acquiring and parsing interface information currently displayed in an electronic device to obtain information about all view controls for a specified window;

S200: parsing the information about view controls, constructing all view controls for the specified window into a view control tree, and building a presentation interface including image views corresponding to all view controls;

S300: receiving a click instruction from a user for clicking one of the image views, removing the image view clicked by the user from the presentation interface, and saving the current presentation interface when a save instruction is received; and S400: capturing an image of the presentation interface in the current screen and saving the captured image.

After a user triggers an action of screen capturing, for example, after the user presses down a combination of preset keys for screen capturing, interface information displayed in the current electronic device is acquired and parsed to obtain information about all view controls for a specified window that the user wants to capture. Then, the information about view controls is parsed, all view controls are constructed into a view control tree, and a presentation interface is built. The presentation interface includes image views corresponding to all view controls, that is, views are presented by pictures. Then, a click instruction from the user to click an image view is received, and the image view clicked by the user is removed from the presentation interface. When the user removes all image views that he/she does not want to capture, a SAVE key is clicked to save the current presentation interface. Preferably, the removed views are saved in a take-out interface, and the user can recover the view removed last time by clicking a BACK key or by clicking a corresponding view in the take-out interface, which avoids the user's misoperations. Then, the presentation interface in the current screen is captured and saved, and the screenshot saved now is a screenshot desired by the user without other interference images. In this way, the user can be free to adjust the current presentation interface during the screen capturing. Therefore, a desired screenshot is obtained, the experience of screen capturing is enriched, and great convenience is brought to the user.

Further, the step S100 comprises:

S101: acquiring interface information currently displayed in the electronic device to obtain information about all windows, and successively parsing the windows; and S102: acquiring information about all view controls for a specified window according to an acquire instruction.

Figure 2:
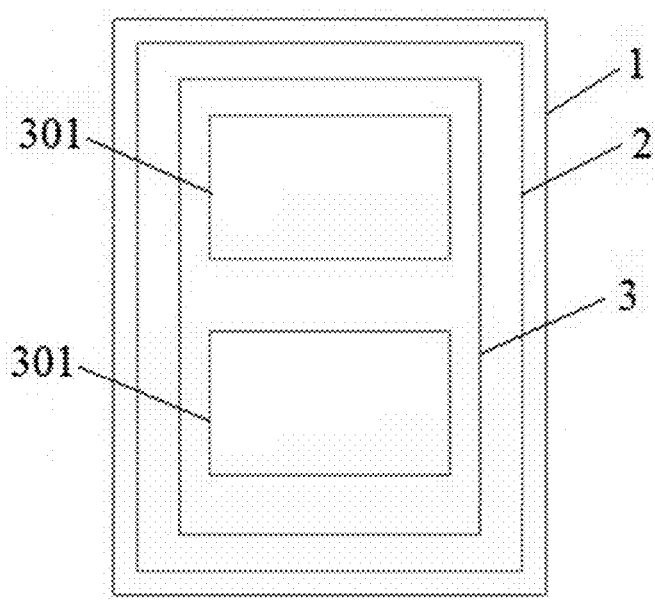
FIG. 2 is a schematic view of compositions of an interface of an electronic device, in the screen capturing method for an electronic device according to the present disclosure.

Referring to FIG. 2, an interface displayed in an electronic device is a window 1 containing multiple views for presentation of the interface. These views for presentation are controlled and packed by a top-level view 2 (for example, DecorView), and other views in the interface are consisting of views with a parallel relation or parent-child relation, including a parent view 3 and child views 301. Meanwhile, there may be multiple windows in the interface. For example, a popWindow pops up by an operation in the interface, and then there are two windows in the interface. In the present disclosure, after an action of screen capturing is triggered, interface information currently displayed in the electronic device is acquired to obtain information about all windows, and the windows are successively parsed; and according to an acquire instruction input by a user, information about all view controls for a specified window that the user wants to capture is acquired.

During the specific implementation, according to the idea of the system debugging tool (HierarchyViewer), the interface information displayed in the electronic device can be acquired by sending a shell command in the electronic device. For example, information about all windows in an interface can be obtained by sending an "LIST" command, the information containing information such as Window Id; and information about all view controls for the window can be acquired by sending "DUMP WINDOW ID" (for example, information about all view controls for a window with a focus on the top of the current interface can be acquired by sending DUMP −1).

Figure 3:
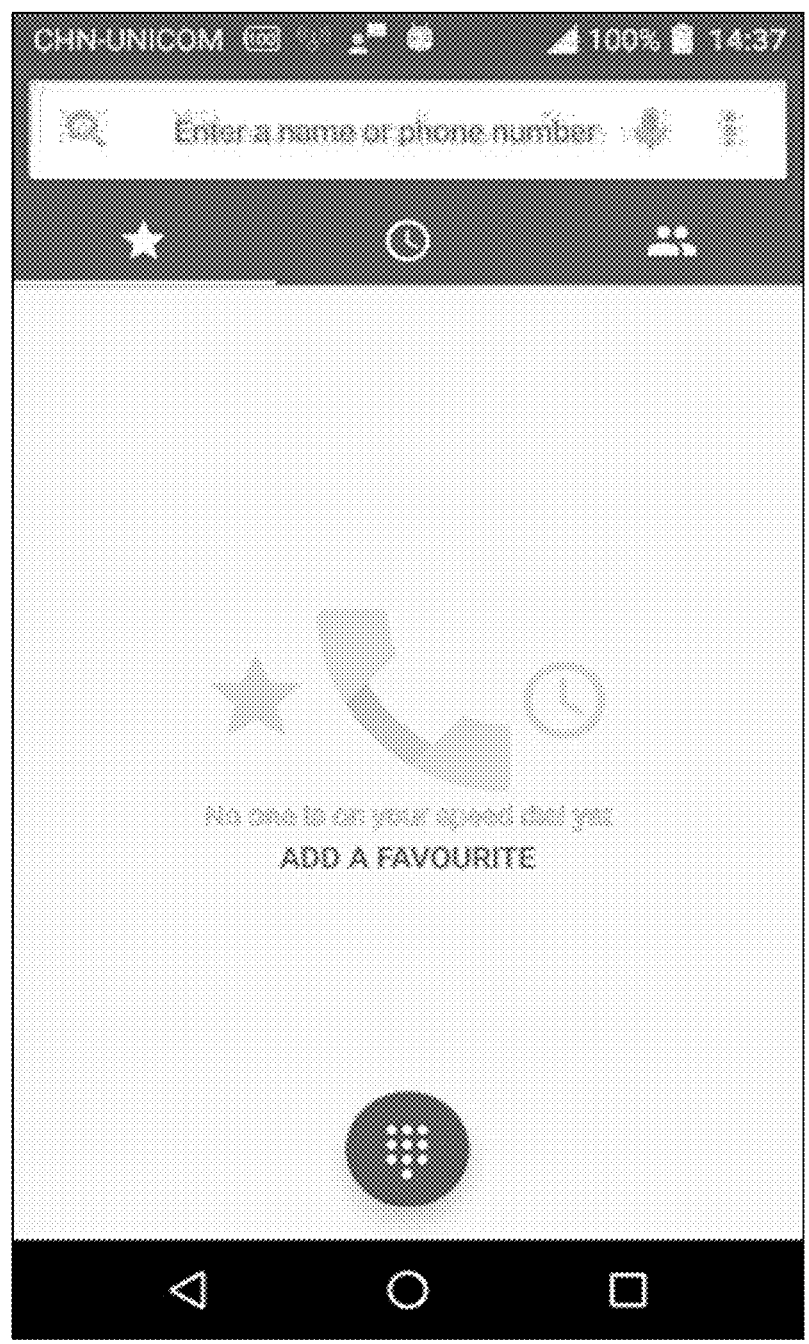
FIG. 3 is a view of an interface displayed in the electronic device, in embodiments of the screen capturing method for an electronic device according to the present disclosure.
Figure 4:
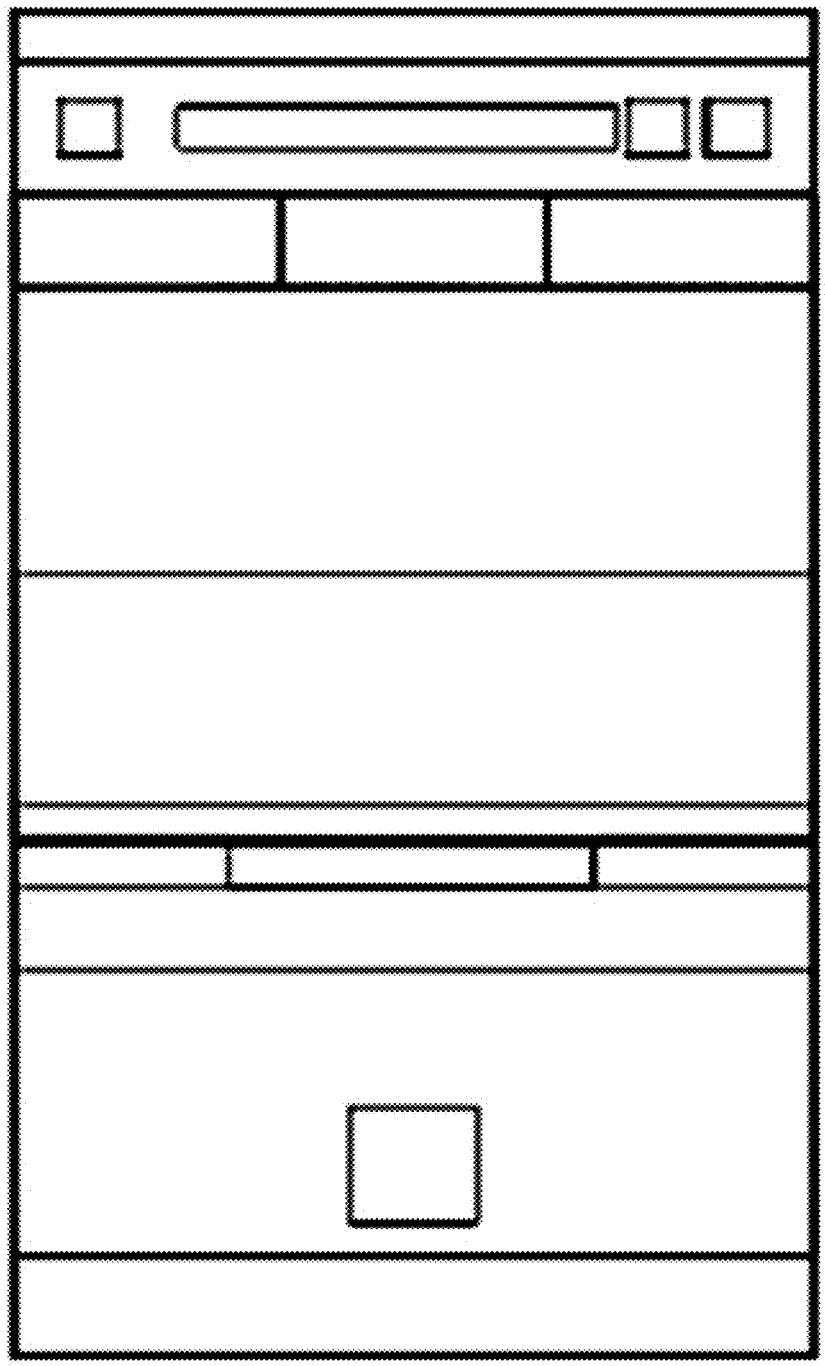
FIG. 4 is an abstract view corresponding to the view of the interface displayed in the electronic device, in embodiments of the screen capturing method for an electronic device according to the present disclosure.

Referring to FIGS. 3 and 4 together, FIG. 3 is a view of an interface displayed in the electronic device in the embodiments of the present disclosure and FIG. 4 is an abstract view of the interface. The presentation interface in the present disclosure is a combination of the both. All views are presented in the presentation interface by image views, so that the user can directly click views that he/her doesn't want, in order to remove them from the presentation interface. The removed views are saved in a take-out interface, and the user can recover a view removed by clicking a BACK key or by clicking the view in the take-out interface.

It is to be noted that FIGS. 3 and 4 are merely provided for auxiliary describing the present disclosure so that the presentation interface in the present disclosure can be better understood, and are not thought to be protected.

In order to realize the presentation interface, the step S200 comprises:

S201: parsing the information about view controls, and constructing all view controls for the specified window into a view control tree;

S202: transmitting information about each view control in the view control tree to a corresponding view node, and converting the information into node attributes of the corresponding view node; and S203: building a presentation interface according to the node attributes of the view node, the presentation interface including image views corresponding to all view controls.

First, the acquired information about view controls is parsed, all controls are constructed into a view control tree, and the relation between all view controls can be obtained by the view control tree, including a parent view, a child view and a correspondence therebetween. The code snippet is as follows:

```
public ViewNode findViewById(String id) {
    ViewNode rootNode = DeviceBridge.loadWindowData(
        new Window(new ViewServerDevice(mDevice), "",
0xffffffff));
    if (rootNode == null) {
        throw new RuntimeException("Could not dump view");
    }
    return findViewById(id, rootNode);
}
```

Code Analysis:

(1) A window object is initialized.

new Window(new ViewServerDevice(mDevice), " ", 0xffffffff)

During the specific implementation, all windows are traversed according to id information. For example, if 0xffffffff is −1, it corresponds to a window currently obtaining a focus.

(2) loadWindowData: a list of all view controls for the window is acquired.

The code snippet is as follows:

```
connection = new DeviceConnection(window.getDevice( ));
connection.sendCommand("DUMP " + window. encode( ));
BufferedReader in = connection.getInputStream( );
ViewNode currentNode = parseViewHierarchy(in, window);
ViewServerInfo serverInfo = getViewServerInfo(window.getDevice( ));
if (serverInfo != null) {
    currentNode.protocolVersion = serverInfo.protocolVersion;
}
return currentNode;
```

Code Analysis:
connection.sendCommand("DUMP"+window. encode( ));

1>a DUMP command is sent to obtain a list of view controls;

2>ViewNode currentNode=parseViewHierarchy(in, window);

parseViewHierarchy is used to parse information about the list of controls returned by ViewServer, and all controls can be constructed into the final control tree by parsing the information.

The following codes show a process of parsing the information about view controls and constructing all view controls into a view control tree by parseViewHierarchy:

```
while ((line = in.readLine( )) != null) {
    if ("DONE.".equalsIgnoreCase(line)) {
        break;
    }
    int depth = 0;
    while (line.charAt(depth) == ' ') {
        depth++;
    }
    while (depth <= currentDepth) {
        if (currentNode != null) {
            currentNode = currentNode.parent;
        }
        currentDepth--;
    }
    currentNode = new ViewNode(window, currentNode,
line.substring(depth));
    currentDepth = depth;
}
```

Code Analysis:

(1) To construct a model of the control tree, spaces are added in front of each control. There is no space in front of the top-level view (DecorView), and there is one space in front of its child views, and so on.

(2) Information about view controls is always read from BufferedReader(in.readLine( )) by while, a line of information being one view control, and then the information is transmitted to a ViewNode object. The ViewNode parses the information about the control and converts the information into its own attributes.

That is, after the view control tree is constructed, information about each view control in the view control tree is transmitted to a corresponding ViewNode object. The ViewNode parses the information about the control and converts the information into node attributes of the corresponding ViewNode. The node attributes of the ViewNode contain information about the view control, including id information of each view, and the width, the height and the coordinates of the upper left point, by which the position of the view in the interface can be known. In addition, the information about the view control also includes a correspondence between a parent view (public ViewNode parent) and a child view (public List<ViewNode> children) or the like. When the user clicks any one of views, a corresponding ViewNode can be known by the id, and attributes of the view, the position of the view in the interface, and the parent view and child view thereof can be obtained accordingly. On the contrary, when the user clicks any one of views in the view control tree, the view on the screen can be known according to the id. The code snippet is as follows:

```
public String id; // the only id of the view
    public String name;
    ...
    public List<Property> properties = new ArrayList( );
    public Map<String, Property> namedProperties = new HashMap( );
    ...
    public int left;
public int top;
public int width;
public int height;
public ViewNode parent;
public List<ViewNode> children = new ArrayList( );
```

After attributes of a view node are obtained, a presentation interface is constructed according to the node attributes. Specifically, the step S203 comprises:

S2031: drawing each view control into a picture separately and saving the picture; and S2032: displaying, according to position information of the view control in the node attributes, the corresponding picture in a same position with an image view to form a presentation interface.

In the present disclosure, the presentation interface is constructed by view nodes. First, each view control is drawn into a picture separately and the picture is saved, the corresponding picture is packaged in the presentation interface by an ImageView control for displaying, and according to position information of the view control in the node attributes and by image views, the corresponding picture is displayed in a same position to form a presentation interface. That is, the size and position of the imageview is correspondingly set according to the size and position of the original view, viewNodes are processed one by one and ranked in an order of root, parent and child. When presentation is finished, all views are presented in the presentation interface by a combination of multiple imageViews. Presenting each view by pictures is convenient for subsequent selection of the user.

Specifically, the step S300 comprises:

S301: receiving a click instruction from a user for clicking one of the image views on the presentation interface;

S302: setting, when an image view is clicked, tag information of a view node corresponding to the image view as "removed", and removing the image view from the current presentation interface; and S303: receiving a save instruction input by the user, and saving the current presentation interface.

In the present disclosure, after the presentation interface is displayed, a click instruction from the user to click an image view in the presentation interface is received, and the event of clicking imageView is preset. When the user clicks imageView, a corresponding view node is found according to id information of the view saved in advance, and its tag (i.e., tag information) is set as "removed". Meanwhile, the imageView is removed. When the user clicks to save the modification, the remaining view is saved. In this way, the interface that the user wants to capture can be obtained. Further, in order to conveniently operate small views in the presentation interface by the user, a scrollView is decorated outside a group of imageviews in the presentation interface. By the determination of gestures, functions of dragging, zooming in and zooming out the interface are provided to the user, so that the user can operate more conveniently.

Figure 5:
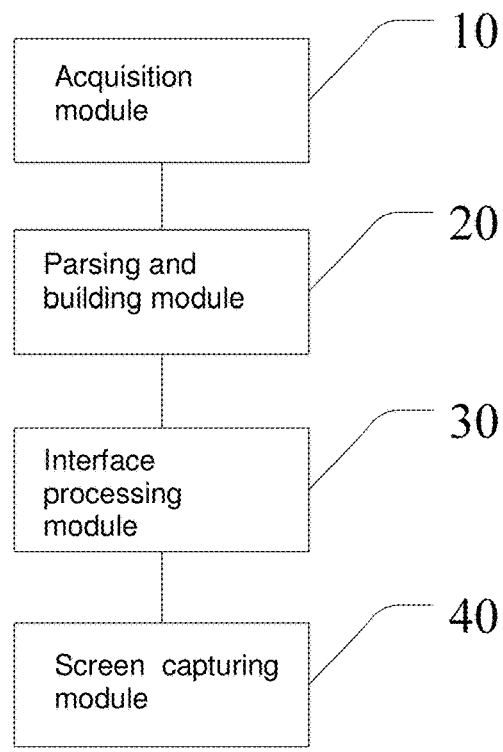
FIG. 5 is a block diagram of the structure of a screen capturing system for an electronic device according to the present disclosure.

Accordingly, the present disclosure further provides a screen capturing system for an electronic device, as shown in FIG. 5, comprising: an acquisition module 10, a parsing and building module 20, an interface processing module 30 and a screen capturing module 40. The acquisition module 10, the parsing and building module 20, the interface processing module 30 and the screen capturing module 40 are successively connected. The acquisition module 10 is configured to acquire and parse interface information currently displayed in an electronic device to obtain information about all view controls for a specified window; the parsing and building module 20 is configured to parse the information about view controls, construct all view controls for the specified window into a view control tree, and build a presentation interface including image views corresponding to all view controls; the interface processing module 30 is configured to receive a click instruction from a user for clicking one of the image views, remove the image view clicked by the user from the presentation interface, and save the current presentation interface when a save instruction is received; and the screen capturing module 40 is configured to capture an image of the presentation interface in the current screen and save the captured image. Please refer to the embodiments of the method for details.

Further, the acquisition module 10 comprises a first acquisition unit (not shown) and a second acquisition unit (not shown). The first acquisition unit is connected to the second acquisition unit. The first acquisition unit is configured to acquire interface information currently displayed in the electronic device to obtain information about all windows, and successively parse the windows; and the second acquisition unit is configured to acquire information about all view controls for a specified window according to an acquire instruction. Please refer to the embodiments of the method for details.

Specifically, the parsing and building module 20 comprises a parsing unit (not shown), an information processing unit (not shown) and a building unit (not shown). The parsing unit, the information processing unit and the building unit are successively connected. The parsing unit is configured to parse the information about view controls, and construct all view controls for the specified window into a view control tree; the information processing unit is configured to transmit information about each view control in the view control tree to a corresponding view node, and convert the information into node attributes of the corresponding view node; and the building unit is configured to build a presentation interface according to the node attributes of the view node, the presentation interface including image views corresponding to all view controls. Please refer to the embodiments of the method for details.

Further, the building unit comprises a drawing subunit (not shown) and a display unit (not shown). The drawing subunit is connected to the display unit. The drawing subunit is configured to draw each view control into a picture separately and save the picture; and the display unit is configured to display, according to position information of the view control in the node attributes, the corresponding picture in a same position with an image view to form a presentation interface. Please refer to the embodiments of the method for details.

Still further, the interface processing module 30 comprises an instruction receiving unit (not shown), a tag setting unit (not shown) and a saving unit (not shown). The instruction receiving unit, the tag setting unit and the saving unit are successively connected. The instruction receiving unit is configured to receive a click instruction from a user for clicking one of the image views on the presentation interface; the tag setting unit is configured to set, when an image view is clicked, tag information of a view node corresponding to the image view as "removed", and remove the image view from the current presentation interface; and the saving unit is configured to receive a save instruction input by the user, and save the current presentation interface. Please refer to the embodiments of the method for details.

Figure 6:
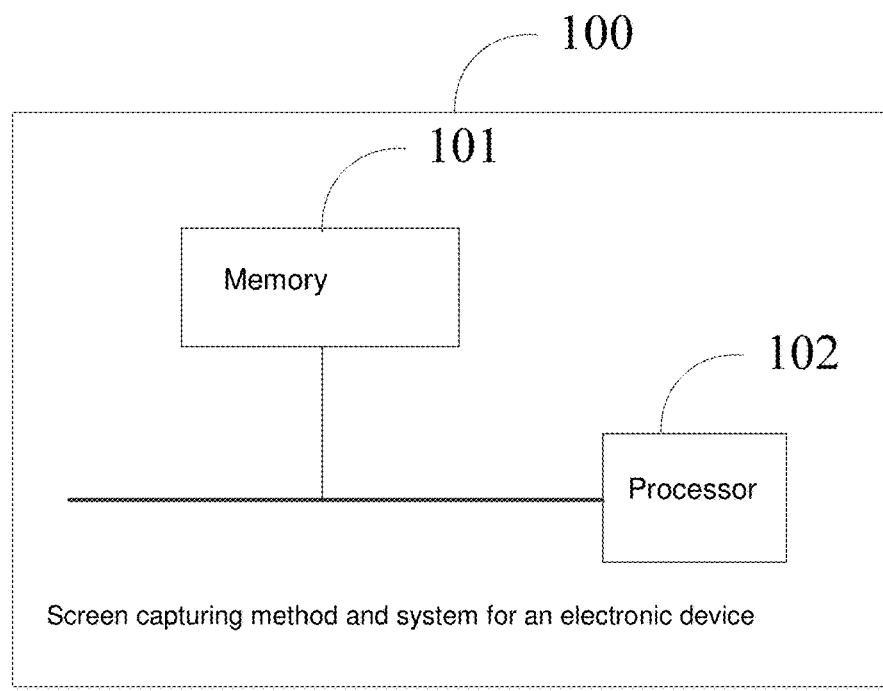
FIG. 6 is a schematic diagram of the structure of the screen capturing system for an electronic device according to the present disclosure.

It can be understood by a person of ordinary skill in the art that all or some of the flows in the method embodiments may be implemented by instructing related hardware by computer (or mobile terminal) programs. The computer (or mobile terminal) programs may be stored in a computer (or mobile terminal) readable storage medium, and when executed, may include the flows of the embodiments of the methods. Wherein, the storage medium may be a magnetic disk, an optical disk, a Read-Only Memory (ROM), a Random Access Memory (RAM) or the like. For example, as shown in FIG. 6, in the embodiments of the present disclosure, the screen capturing system 100 for an electronic device comprises a processor 101 and a memory 102. The memory 102 is connected to the processor 101, and the programs are stored in the memory 102 and configured to be executed by the processor 101.

The present disclosure further provides an electronic device having the screen capturing system described above, comprising:

one or more processors;

a memory; and one or more applications stored in the memory and configured to perform, when executed by the processors, the following steps:

acquiring interface information currently displayed in the electronic device to obtain information about all windows, and successively parsing the windows; and acquiring information about all view controls for a specified window according to an acquire instruction;

parsing the information about view controls, constructing all view controls for the specified window into a view control tree, and building a presentation interface including image views corresponding to all view controls;

receiving a click instruction from a user for clicking one of the image views, removing the image view clicked by the user from the presentation interface, and saving the current presentation interface when a save instruction is received; wherein the removed view is saved in a take-out interface, and the user recovers the view removed last time by clicking a BACK key or by clicking a corresponding view in the take-out interface; and capturing an image of the presentation interface in the current screen and saving the captured image.

In the electronic device having the screen capturing system, the step of parsing the information about view controls, constructing all view controls for the specified window into a view control tree, and building a presentation interface including image views corresponding to all view controls comprises steps of:

parsing the information about view controls, and constructing all view controls for the specified window into a view control tree;

transmitting information about each view control in the view control tree to a corresponding view node, and converting the information into node attributes of the corresponding view node; and building a presentation interface according to the node attributes of the view node, the presentation interface including image views corresponding to all view controls.

In the electronic device having the screen capturing system, the step of building a presentation interface according to the node attributes of the view node, the presentation interface including image views corresponding to all view controls, comprises steps of:

drawing each view control into a picture separately and saving the picture; and displaying, according to position information of the view control in the node attributes, the corresponding picture in a same position with an image view to form a presentation interface.

In the electronic device having the screen capturing system, the step of receiving a click instruction from a user for clicking one of the image views, removing the image view clicked by the user from the presentation interface, and saving the current presentation interface when a save instruction is received comprises steps of:

receiving a click instruction from a user for clicking one of the image views on the presentation interface;

setting, when an image view is clicked, tag information of a view node corresponding to the image view as "removed", and removing the image view from the current presentation interface; and receiving a save instruction input by the user, and saving the current presentation interface.

In conclusion, in the screen capturing method and system for an electronic device and the electronic device according to the present disclosure, the screen capturing method for an electronic device comprises the following steps of: acquiring and parsing interface information currently displayed in an electronic device to obtain information about all view controls for a specified window; parsing the information about view controls, constructing all view controls for the specified window into a view control tree, and building a presentation interface including image views corresponding to all view controls; receiving a click instruction from a user for clicking one of the image views, removing the image view clicked by the user from the presentation interface, and saving the current presentation interface when a save instruction is received; and capturing an image of the presentation interface in the current screen and saving the captured image. By parsing and rebuilding the current presentation interface to display all views in the presentation interface, users can be free to select parts that they don't want to capture, to finally generate a desired screenshot. The experience of screen capturing is enriched, various user demands are met better, and the function of free screen capturing is realized.

It should be understood that, a person of ordinary skill in the art may make equivalent replacements or alterations according to the technical solutions of the present disclosure and the inventive concept, and all the alterations or replacements shall fall into the protection scope defined by the appended claims of the present disclosure.

What is claimed is:

1. A screen capturing method for an electronic device having a screen capturing system comprising one or more processors, a memory, and one or more applications stored in the memory and configured to be executed by the one or more processors to perform the screen capturing method, the screen capturing method comprising the following steps of:

acquiring and parsing interface information currently displayed in an electronic device to obtain information about all view controls for a specified window;

parsing the information about view controls, constructing all view controls for the specified window into a view control tree, and building a presentation interface including image views corresponding to all view controls, comprising steps of:

parsing the information about the view controls, and constructing all view controls for the specified window into the view control tree;

transmitting information about each view control in the view control tree to a corresponding view node, and converting the information into node attributes of the corresponding view node; and building the presentation interface according to the node attributes of the view node, the presentation interface including image views corresponding to all view controls, comprising steps of:

drawing each view control into a picture separately and saving the picture; and displaying, according to position information of the view control in the node attributes, the corresponding picture in a same position with one of the image views to form the presentation interface;

receiving a click instruction from a user for clicking one of the image views, removing the image view clicked by the user from the presentation interface, and saving the current presentation interface when a save instruction is received; and capturing an image of the presentation interface in the current screen and saving the captured image.

2. The screen capturing method for an electronic device according to claim 1, wherein the step of acquiring and parsing interface information currently displayed in an electronic device to obtain information about all view controls for a specified window comprises steps of:

acquiring interface information currently displayed in the electronic device to obtain information about all windows, and successively parsing the windows; and acquiring information about all view controls for a specified window according to an acquire instruction.

3. The screen capturing method for an electronic device according to claim 1, wherein the step of receiving a click instruction from a user for clicking one of the image views, removing the image view clicked by the user from the presentation interface, and saving the current presentation interface when a save instruction is received comprises steps of:

receiving a click instruction from a user for clicking one of the image views on the presentation interface;

setting, when an image view is clicked, tag information of a view node corresponding to the image view as "removed", and removing the image view from the current presentation interface; and receiving a save instruction input by the user, and saving the current presentation interface.

4. The screen capturing method for an electronic device according to claim 3, wherein the removed image view is saved in a take-out interface and is configured to be selectively recovered by the user by clicking a BACK key or by being clicked in the take-out interface.

5. A screen capturing system for an electronic device, comprising:

one or more processors;

a memory; and one or more applications stored in the memory and configured to be executed by the processors, comprising:

an acquisition module configured to acquire and parse interface information currently displayed in an electronic device to obtain information about all view controls for a specified window;

a parsing and building module configured to parse the information about view controls, construct all view controls for the specified window into a view control tree, and build a presentation interface including image views corresponding to all view controls;

wherein the parsing and building module comprises:

a parsing unit configured to parse the information about the view controls, and construct all view controls for the specified window into the view control tree;

an information processing unit configured to transmit information about each view control in the view control tree to a corresponding view node, and convert the information into node attributes of the corresponding view node; and a building unit configured to build the presentation interface according to the node attributes of the view node, the presentation interface including image views corresponding to all view controls;

wherein the building unit comprises:

a drawing subunit configured to draw each view control into a picture separately and save the picture; and a display unit configured to display, according to position information of the view control in the node attributes, the corresponding picture in a same position with one of the image views to form the presentation interface;

an interface processing module configured to receive a click instruction from a user for clicking one of the image views, remove the image view clicked by the user from the presentation interface, and save the current presentation interface when a save instruction is received; and a screen capturing module configured to capture an image of the presentation interface in the current screen and save the captured image.

6. The screen capturing system for an electronic device according to claim 5, wherein the acquisition module comprises:

a first acquisition unit configured to acquire interface information currently displayed in the electronic device to obtain information about all windows, and successively parse the windows; and a second acquisition unit configured to acquire information about all view controls for a specified window according to an acquire instruction.

7. The screen capturing system for an electronic device according to claim 5, wherein the interface processing module comprises:

an instruction receiving unit configured to receive a click instruction from a user for clicking one of the image views on the presentation interface;

a tag setting unit configured to set, when an image view is clicked, tag information of a view node corresponding to the image view as "removed", and remove the image view from the current presentation interface; and a saving unit configured to receive a save instruction input by the user, and save the current presentation interface.

8. The screen capturing system for an electronic device according to claim 7, wherein the removed image view is saved in a take-out interface and is configured to be selectively recovered by the user by clicking a BACK key or by being clicked in the take-out interface.

9. An electronic device having a screen capturing system, comprising:

one or more processors;

a memory; and one or more applications stored in the memory and configured to perform, when executed by the processors, the following steps:

acquiring and parsing interface information currently displayed in an electronic device to obtain information about all view controls for a specified window;

parsing the information about view controls, constructing all view controls for the specified window into a view control tree, and building a presentation interface including image views corresponding to all view controls, comprising steps of:

parsing the information about the view controls, and constructing all view controls for the specified window into the view control tree;

transmitting information about each view control in the view control tree to a corresponding view node, and converting the information into node attributes of the corresponding view node; and building the presentation interface according to the node attributes of the view node, the presentation interface including image views corresponding to all view controls, comprising steps of:

drawing each view control into a picture separately and saving the picture; and displaying, according to position information of the view control in the node attributes, the corresponding picture in a same position with one of the image views to form the presentation interface;

receiving a click instruction from a user for clicking one of the image views, removing the image view clicked by the user from the presentation interface, and saving the current presentation interface when a save instruction is received; wherein the removed image view is saved in a take-out interface and is configured to be selectively recovered by the user by clicking a BACK key or by being clicked in the take-out interface; and capturing an image of the presentation interface in the current screen and saving the captured image.

10. The electronic device having the screen capturing system according to claim 9, wherein the step of acquiring and parsing interface information currently displayed in an electronic device to obtain information about all view controls for a specified window comprises steps of:

acquiring interface information currently displayed in the electronic device to obtain information about all windows, and successively parsing the windows; and acquiring information about all view controls for a specified window according to an acquire instruction.

11. The electronic device having the screen capturing system according to claim 9, wherein the step of receiving a click instruction from a user for clicking one of the image views, removing the image view clicked by the user from the presentation interface, and saving the current presentation interface when a save instruction is received comprises steps of:

receiving a click instruction from a user for clicking one of the image views on the presentation interface;

setting, when an image view is clicked, tag information of a view node corresponding to the image view as "removed", and removing the image view from the current presentation interface; and receiving a save instruction input by the user, and saving the current presentation interface.

* * * * *